July 16, 1935.  R. W. WEEKS  2,008,234

IMPELLER

Filed Dec. 16, 1932

Inventor
ROBERT W. WEEKS
By Ralph B. Stewart
Attorney

Patented July 16, 1935

2,008,234

UNITED STATES PATENT OFFICE 2,008,234

IMPELLER

Robert W. Weeks, West Chester, Pa.

Application December 16, 1932, Serial No. 647,637

8 Claims. (Cl. 170—159)

My invention relates to impellers for transforming the energy of fluid streams into mechanical energy or for transforming mechanical energy into the energy of fluid streams.

The invention particularly relates to wind turbines for driving power plants.

An object of the invention is to provide an impeller of light construction while retaining sufficient strength and rigidity to withstand high wind pressures and centrifugal forces.

Another object of my invention is to provide an impeller or blade with is non-corrosive and rust resisting, thereby resulting in a blade having low and constant wind friction.

Another object of the invention is to provide a wind turbine for driving power generating units for furnishing power to airplane marker beacons in isolated sections; the vanes or blades of which are constructed of highly efficient light reflective material so that the turbine will reflect the sunlight and serve as daytime markers for the air course.

In sections of the country in which electric power for lighting is not easily attainable, it is common to use storage battery units which are charged by generators driven by wind turbines. To increase the efficiency of these turbines it is essential that the rotating element be as light as possible, thus reducing unnecessary friction and making the turbine operate on low velocity winds. By decreasing the weight of the turbine the supporting structure or tower can be made of lighter construction, and this results in a considerable saving in cost.

Various materials have heretofore been used to construct impeller blades. Aluminum and aluminum alloys, particularly duralumin, have not been extensively used. Many existing impeller units are constructed of wood. These are solid and not cellular construction. Galvanized sheet iron or steel have been used for impellers of types other than airfoil section and noncellular construction. I have discovered that stainless steel with a content of approximately 18% chromium and 8% nickel, provides a material for construction of fabricated blades which results in the lightest attainable structure for impellers, and also provides a non-corrosive, rust-resistive highly reflective surface. The ratio of tensile strength to weight for duralumin is larger than for stainless steel in relatively large thicknesses, but as extreme thiness is approached, in the neighborhood of .01 or .02 of an inch, the elastic limit of duralumin becomes increasingly small, and, therefore, the ratio of strength to weight of stainless steel becomes larger than for duralumin for such dimensions. In constructing the impeller blade according to my invention I use stainless steel sheets of #28 or #30 U. S. Standard gauge (0.01562 or 0.0125 inches thickness), thereby permitting a very light fabricated structure to be built. Hollow blade construction may be employed, using internal bracing and spot welding to secure the units together. By this method, units of large capacity can be built economically and of light weight.

The preferred construction of a wind turbine, built in accordance with my invention, is shown in the accompanying drawing, in which.

Figure 1:
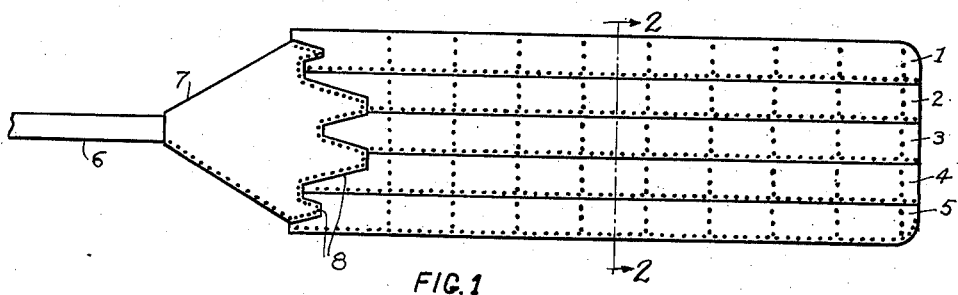
Figure 1 is a side view of a single-blade impeller of the type shown in patent to Stuart 1,802,094, made in accordance with my invention.
Figure 2:
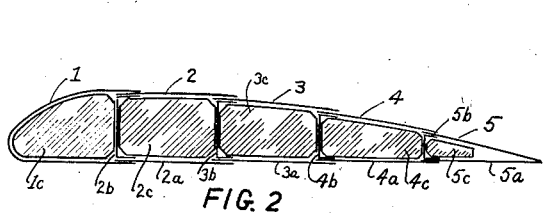
Figure 2 is an enlarged cross section of Figure 1 along the line 2—2, showing schematically the manner in which the blade is built up of sheet material.
Figure 3:
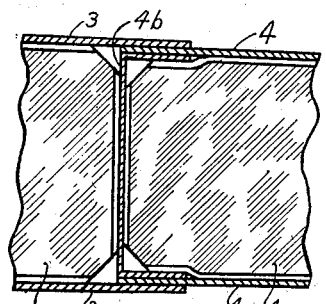
Figure 3 is an enlarged fragmentary view of Figure 2.

Referring to Figures 1 and 2, the blade is formed in suitable airfoil section with the outer surface formed of a number of sheets of stainless steel 1, 2, 3, 4, 5 and 2a, 3a, 4a and 5a, welded together along their overlapping edges by spot welding. Suitable sheets of steel 2b, 3b, 4b and 5b, formed as channel members extending throughout the length of the blade are arranged at each seam and their side flanges are welded to the upper and lower surface sheets to provide suitable bracing and rigidity to the structure. Cross-bracing channel members 1c, 2c, 3c, 4c and 5c, are arranged at frequent intervals between the longitudinal channel members and are spot welded to the surface sheets of the blade. This construction results in a cellular airfoil section made entirely of sheet stainless steel. The manner in which the sheets over-lap is shown in Figure 2 where for the sake of clearness, the sheets are shown without thickness and spaced apart from each other. Figure 3 is an enlarged view of a section of Figure 2 showing in detail the arrangement of the surface sheets and the internal bracing members. The thickness of the sheets has been greatly exaggerated.

The built-up airfoil blade is secured to a supporting shaft 6 by a hollow shank member 7, which may be formed of a single sheet of metal folded to form the leading edge of the shank and the edges welded together along the trailing edge. The shank member is provided with a plurality of finger like extensions 8 engaging both sides of the blade and forming a zigzag edge along which the shank is welded to the blade. This construction affords more contact surface for the welds and is less liable to rupture than where the welds are formed in a straight line. The shank 7 is also provided with suitable internal bracing like that of the blade for adding strength and rigidity and for securing the shank to the shaft. It will be understood that the shaft is provided with a hub and is mounted for rotation about an axis, and is counter-weighted on the opposite side of the axis. Where more than one blade is provided, as for example, on a two, three, or multiblade wind turbine the counter-weight used on the one blade turbine is of course omitted.

Figure 4:
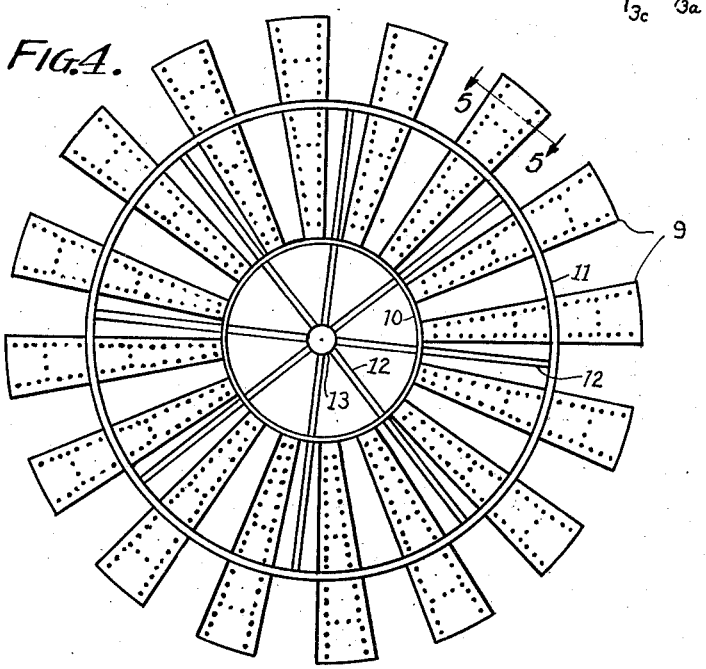
Figure 4 is a vertical view of a multiblade impeller.
Figure 5:
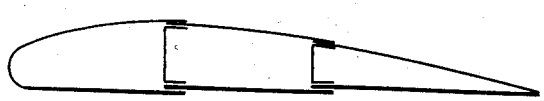
Figure 5 is an enlarged cross section of one of the blades shown in Figure 4 along the line 5—5.

In Fig. 4, a multiblade impeller is shown similar to those in common use for pumping water. The blades 9 of the impeller are secured on the inner ends to the ring 10 and near their outer ends to the ring 11 by suitable means. The rings 10 and 11 are carried by the spokes 12 secured in the hub 13 which is provided with the usual axle (not shown) and mounted for rotation. The blades 9 are built in airfoil section similar to the blade in Figure 1 except that they are tapered instead of having a constant width. The manner in which the blades are formed from sheets of stainless steel is schematically shown in Figure 5. The leading edge is formed of a single sheet bent in proper form so that the open edges embrace sheets forming the middle section of the blade, with a longitudinal channel member interposed, and the whole is spot welded together. A similar joint is provided between the middle section and the trailing section, and the trailing edge is formed by welding together the edges of the two sheets forming the trailing section.

By taking into consideration the tensile strength, the modulus of elasticity and the specific gravity of various materials, it will be found that the material which I use, stainless steel, offers a saving in weight of from 6 to 8 times that of galvanized iron and approximately two times that of aluminum. The higher modulus of elasticity as well as the high tensile strength of the stainless steel more than offsets its greater weight as compared to aluminum and its alloys. On account of its rust resisting properties, stainless steel of very much lighter section can be used as compared with the ordinary galvanized or painted carbon steel.

The light weight of the rotating element greatly facilitates starting. The inertia is less and the devices will start with very much less torque.

While I have indicated that sheets of #28 or #30 gauge are suitable for constructing my impeller, it will be understood that even thinner gauges may be employed for the skin or surface sheets, and thicker sheets may be used for the self supporting internal bracing and supporting structure. Also, in the larger blades thicker material may be used near the hub and thinner material towards the tip. I have built and successfully operated a blade of the type shown in Figure 1 having a radius of ten feet, but it is feasible and practical to build blades of this type having a radius as high as 100 to 150 feet. In these larger blades it is possible to use sheets of ⅛ inch thickness for the internal structure, using spot welding to secure the elements together.

It will be obvious to those skilled in the art that the details of construction may be varied in many ways without departing from the spirit of my invention.

What I claim is:

1. An impeller blade comprising a cellular airfoil section having its skin or outer surface formed of sheet stainless steel of a thickness of the order of 0.0125 inches.

2. An impeller blade comprising a cellular airfoil section formed of sheets of stainless steel spot welded together and having a thickness of the order of 0.0125 inches.

3. A blade for a wind turbine comprising a cellular airfoil section having a uniform cross-section substantially throughout its length and being formed of sheet stainless steel of a thickness of the order of 0.0125 inches.

4. An impeller blade comprising a self-supporting skeleton frame having an airfoil section, and a skin or outer surface formed of sheet stainless steel of a thickness of the order of 0.0125 inches.

5. An impeller blade having an air-foil section and provided with a surface formed of a plurality of thin metal sheets extending longitudinally of the blade, said sheets being arranged so that the trailing edge of one sheet overlaps the leading edge of an adjacent sheet, longitudinal bracing members for said section comprising channel members arranged within said blade and located between opposite seams on the upper and lower surfaces of the blade, the flanges of said channel members being spot welded to the overlapping edges of said surface sheets.

6. An impeller blade having an air-foil section and comprising upper and lower surfaces formed of a plurality of thin sheets of stainless steel extending longitudinally of the blade of a thickness of the order of 0.0125 inches, said sheets being arranged so that the trailing edge of one sheet overlaps the leading edge of an adjacent sheet, said upper and lower surfaces being joined along the leading edge by a thin metal sheet bent transversely to form the leading edge of the blade, longitudinal bracing channel members arranged within said blade section and located between opposite seams formed in the upper and lower surfaces, and the overlapping edges forming said seams being welded together and to the flanges of said channel members.

7. An impeller blade having an airfoil section and comprising upper and lower surfaces formed of a plurality of thin metal sheets extending longitudinally of the blade, said sheets being arranged so that the trailing edge of one sheet overlaps the leading edge of an adjacent sheet, said upper and lower surfaces being joined along the leading edge by a thin metal sheet bent transversely to form the leading edge of the blade, longitudinal bracing channel members arranged within said blade section and located between opposite seams formed in the upper and lower surfaces, the overlapping edges forming said seams being welded together and to the flanges of said channel members, and cross-bracing channel members arranged within said blade transversely thereof and having flanges welded to the upper and lower surfaces of said blade.

8. An impeller blade having an air-foil section and comprising upper and lower surfaces formed of a plurality of thin metal sheets of uniform thickness extending substantially the entire length of the blade, said sheets being arranged so that the trailing edge of one sheet overlaps the leading edge of an adjacent sheet, said upper and lower surfaces being joined along the leading edge by a thin metal sheet bent transversely to form the leading edge of the blade, longitudinal bracing channel members arranged within said blade section and located between opposite seams formed in the upper and lower surfaces, the overlapping edges forming said seams being welded together and to the flanges of said channel members, and the trailing edges of said upper and lower surfaces being welded together to form the trailing edge of the blade.

ROBERT W. WEEKS.